United States Patent [19]
Teichler et al.

[11] Patent Number: 6,005,188
[45] Date of Patent: Dec. 21, 1999

[54] STATIONARY HOUSING WITH WALL ELEMENTS MADE OF PLASTIC

[75] Inventors: Heide Teichler; Adrian Benedetto; Winfried Worch, all of Berlin, Germany

[73] Assignee: Krone AG, Germany

[21] Appl. No.: 09/038,884

[22] Filed: Mar. 11, 1998

[30] Foreign Application Priority Data

Mar. 12, 1997 [DE] Germany .......................... 197 11 980

[51] Int. Cl.⁶ ...................................... H01J 5/00
[52] U.S. Cl. ................... 174/50; 174/58; 174/60; 220/4.02
[58] Field of Search .................. 174/38, 17 R, 174/17 CT, 37, 58, 59, 60, 101, 50; 220/3.3, 4.02; 52/3, 23

[56] References Cited

U.S. PATENT DOCUMENTS

| | | | |
|---|---|---|---|
| 3,293,588 | 12/1966 | Blonder | 439/588 |
| 3,796,820 | 3/1974 | Bunten | 174/38 |
| 3,868,474 | 2/1975 | Bunten | 174/38 |
| 3,991,264 | 11/1976 | Connell | 174/38 |
| 4,631,353 | 12/1986 | Marks | 174/16.1 |
| 5,147,981 | 9/1992 | Buet et al. | 174/52.1 |
| 5,239,129 | 8/1993 | Ehrenfels | 174/50 X |
| 5,473,115 | 12/1995 | Brownlie et al. | 174/50 |

FOREIGN PATENT DOCUMENTS

| | | |
|---|---|---|
| 0 465 378 A1 | 1/1992 | European Pat. Off. . |
| 1 704 750 | 8/1955 | Germany . |
| 1842878 | 12/1961 | Germany . |
| 1 972 982 | 11/1967 | Germany . |
| 77 35 649 U1 | 8/1979 | Germany . |
| 80 07 287 U1 | 6/1980 | Germany . |
| 75 05 687 U1 | 10/1980 | Germany . |
| 32 05 934 | 9/1983 | Germany . |
| 34 20 185 A1 | 1/1985 | Germany . |
| 33 34 587 A1 | 4/1985 | Germany . |
| 34 47 646 A1 | 7/1986 | Germany . |
| 36 12 511 A1 | 1/1987 | Germany . |
| 90 06 897 | 10/1990 | Germany . |
| 295 960 A5 | 11/1991 | Germany . |
| 40 39 502 A1 | 6/1992 | Germany . |
| 43 42 740 A1 | 6/1995 | Germany . |
| 296 14 822 U1 | 11/1996 | Germany . |
| 196 12 167 A1 | 10/1997 | Germany . |
| 295 960 A5 | 11/1997 | Germany . |
| 34 20 185 A1 | 11/1997 | Germany . |
| 36 12511 A1 | 11/1997 | Germany . |
| 1 001 265 | 8/1965 | United Kingdom . |
| 2 280 994 A1 | 2/1995 | United Kingdom . |

OTHER PUBLICATIONS

Repco—Series RP6/35, Sep. 1973.
Krone, "Kabelverzweigergeh äuse aus Kunststoff" *Krone Publication*, Translation No.

*Primary Examiner*—Kristine Kincaid
*Assistant Examiner*—Dhiru R Patel
*Attorney, Agent, or Firm*—McGlew and Tuttle, P.C.

[57] ABSTRACT

A stationary housing for accommodating electrical arrangements, in particular cable-branching arrangements. The housing includes separately produced wall elements which are made of plastic and can be assembled in a positively locking manner on site, a dimensionally stable framework serving as carrier for the electrical arrangements an being enclosed by these plastic parts such that joints are produced on the side walls and the housing roof. The plastic parts are optionally stiffened to a further extent by corresponding profilings or corner enforcements and are formed of glass-fiber-reinforced polyester, polypropylene or polyethylene with appropriate coloring and UV-resistance. One person can easily assemble a housing of this type on site in a few minutes and, if required, dismantle it again for repair purposes.

20 Claims, 4 Drawing Sheets

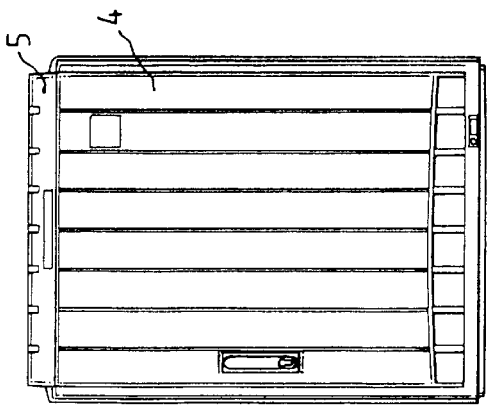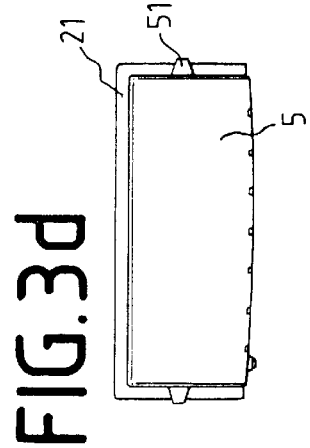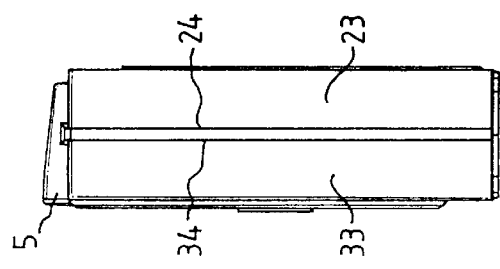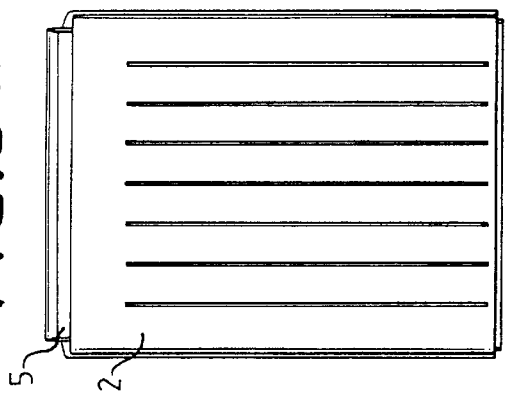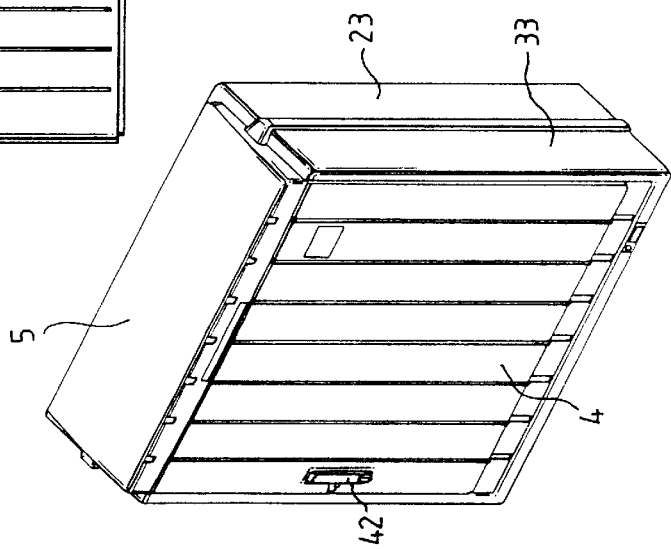

"Z"

STATIONARY HOUSING WITH WALL ELEMENTS MADE OF PLASTIC

FIELD OF THE INVENTION

The invention relates to a stationary housing for accommodating electrical arrangements, in particular cable-branching arrangements.

BACKGROUND OF THE INVENTION

Housings of this type are often used for the weatherproof accommodation of components used in telecommunications and data transfer applications, the framework being arranged on a base, from which the cables emerge, and serving to retain the abovementioned components, to which or from which cables are then routed.

Outdoor housings in the case of which the base is connected to a bottom base part and the two are designed integrally together, the bottom base part often being set in the ground, are known. This bottom base part serves, on the one hand, for mechanically stabilizing the outdoor housing and, on the other hand, for protecting the cables emerging from the earth.

In order to fulfill the constantly increasing requirements for information, it is necessary to install new telecommunications and data networks or to enlarge existing networks. Regardless of the type of cabling technology or radio technology used in telecommunications, all the technologies have in common the fact that electrical components have to be decentralized more and more from the regional exchanges or telecommunications centers to residential developments or remote branch locations. The applicant has already proposed, in other applications, to double the frameworks provided on such bases and to form new housing structures by arranging similar conventional outdoor housings in parallel or by using hollow profile rails. These are metal parts which themselves have sufficient inherent rigidity and serve, in any order, for encasing the frameworks, or the rails themselves are parts of the frameworks for the attachment of the electrical components.

A further problem is that the cable-branching arrangements which are increasingly having to be set up or similar distributor housings or housings for radio stations in existing residential developments must not be obtrusive. Hitherto conventional, functional outdoor housings seldom satisfy this requirement. A further problem is that the prior-art outdoor housings assembled using metal or plastic parts are not very user-friendly.

SUMMARY AND OBJECTS OF THE INVENTION

The problem on which the invention is based is thus to configure stationary housings of the above-described type such that they are user-friendly, both as far as operation of the electrical components is concerned and from the point of view that the intention, as far as possible, is for one person to be able to assemble the housings quickly and easily. A further problem is posed by the task of adapting the relatively large stationary housings to the surrounding residential developments.

According to the invention, a stationary housing is provided for accommodating electrical arrangements, in particular cable-branching arrangements. The housing includes separately produced wall elements which are made of recyclable, weatherproof plastic and, assembled in a positively locking manner. These are provided so as to enclose a dimensionally stable framework. In each case one wall element forms a front part and a rear part and integrally formed parts simultaneously form the side walls of a cuboidal housing.

According to a further aspect of the invention, an outdoor housing for accommodating electrical components is provided wherein a dimensionally stable framework made of metal is fixed on the base of a cable-branching arrangement and can be enclosed, using on-site assembly, by wall elements comprising a split bottom panel, a rear wall, a front wall with door, and a roof, all the parts being prefabricated from plastic, and the front wall and the rear wall simultaneously forming, by way of integral parts, the side walls and being joined together there.

The invention is based on the idea that plastic parts are weatherproof and can be produced in any design and color. In addition, plastic parts are relatively lightweight and, even in the case of large-surface-area parts of 1 m×1 m and a wall thickness of approximately 3 mm, can easily be handled by one person. Taking this as the departure point, it is proposed for stationary housings of this type to be assembled from separately prefabricated wall elements which are made of recyclable plastic, are held together by positive locking and, together, enclose a dimensionally stable framework. This framework serves for the attachment of the electrical components, e.g. for a cable branching or for accommodating relay stations and the like.

The housing ideally comprises the same kind of front-wall parts and rear-wall parts, which simultaneously form integral parts of the side walls and/or of the roof parts of such a housing, which is usually of cuboidal design. Two such parts can enclose a metal framework, which is arranged, for example on the base of a cable-branching arrangement, by the parts being pushed toward one another and by the side parts of the front and rear housing halves latching one inside the other in accordance with the groove/tongue principle in the process. This method or design of the joint on the surface has proved very successful in suitcases and provides the housing with a higher degree of rigidity than housings which are joined together at the corner regions.

If appropriate, the joining grooves or joints may also be designed in the manner of a labyrinth, so as to prevent the penetration of rain water. If there is a risk of the housing being exposed to strong winds or other types of mechanical loading, the joints may additionally be designed with latching noses or latching devices, with the result that the housing halves can be secured to one another.

Instead of two identical components which can easily be unlatched from one another, it is also possible to use different parts, in particular if very large stationary housings are to be provided. In this case, it is expedient to provide one of the wall elements, e.g. the front part, with a closable opening and, in turn, to close this opening itself with a closure panel, comprising a plastic part, it being possible, in the same way as with conventional doors, to use hinges and pivot-lever securing means. It is also possible here to use locks or similar securing devices, as are known per se.

For the purpose of centering on the framework, the front part and the rear part may likewise be provided with latching noses or guidance devices which are guided and retained on framework elements of complementary design. Such guidance parts or retaining parts for the framework should, of course, be attached internally on the housing parts or wall elements, in order that dismantling of the housing is not possible from the outside and only becomes possible when the closure panel has been opened.

Housings of this type may be provided with a single-piece housing roof which, for its part, can be pushed into the housing halves or wall elements and can be fastened from the inside of the wall elements, if appropriate, with the aid of screws or rivets. The housing roof is configured according to the invention such that the joints of the wall elements, or of the front and rear housing halves, are covered over by corresponding protrusions on the roof.

A possibly hermetically sealed plastic housing of such a cable-branching arrangement, in particular if the bottom and the cable inlets are sealed by corresponding cable seals, e.g. cable sleeves made of rubber, develops a large amount of heat, which, depending on the weather conditions, could result in the corresponding formation of condensed water on the roof of the housing.

For this reason, it is envisaged to integrate an inset in the roof or to form a drip nose on the roof, with the result that in each case the condensed water can drip off outside the region of the framework and of the electronic components arranged on the framework. Alternatively, the formation of condensed water can be avoided by appropriate design of the roof, e.g. producing a chimney effect by way of an opening which is directed toward the outside. A further possibility is for the condensed water, once formed, to be collected in a basin or in a sponge-like inset and for the water to be routed outward from there or for condensed water to be discharged again gradually as atmospheric moisture.

In order to stabilize a wall element further, it may be provided according to the invention for this wall element to be profiled on one side. This may consist in general curvature of the components overall or in the formation of beads or ribs on specific parts, preferably on the outsides of the housing. A stabilizing arrangement of this type can be laminated by a corresponding design of the housings, for which purpose appropriate coloring may also be helpful.

The bottom panel of the housing is preferably split, with the result that the bottom halves can be pushed toward the framework from both sides and corresponding cable-insertion sleeves on the bottom of the housing are enclosed.

The plastic used is preferably a glass-fiber-reinforced polyester material which is designed as a laminate or is produced as a standard molding (amc sheet molding compound), if appropriate made of recycled material. Depending on the size of the part, however, the latter may also be an injection molding which consists of modified polypropylene or polyethylene, although the weights of the parts increase as a result if the inherent rigidity is not sufficient. It should be ensured here that appropriate LTV-stabilizers are incorporated in the injection-molding compound, although this is known per se from the prior art.

For reasons of heat insulation, for the purpose of minimizing condensed water, or of sound insulation, for the purpose of preventing disruptive noise, the wall elements may also be lined with an insulation, which is preferably fastened on the wall elements using clamping elements, with the result that dismantled housings can easily be supplied to a recycling process. The task of segregating different plastics from one another can thus be avoided. The same applies for door seals or joint seals which may optionally be provided.

In order to be able to design the plastic housings to be as lightweight as possible, it is also envisaged to use stationary rigid frameworks comprising sheet-metal frames or the like and to fit strain-relief rails therein, and cables which are to be introduced can be suspended on these rails using corresponding clamps or suspension means. The loading is then transferred only to the framework and not to the housing parts, with the result that the latter can be designed to be correspondingly lightweight.

In the case of relatively small housings, however, it may also be envisaged for the framework to be designed as an integral part of a wall element, or for the wall elements to be stiffened, for example in their corners, such that, at these points, frameworks can be fitted or strain-relief rails can be positioned.

An outdoor housing as the cable-branching arrangement may be configured on a base, as is often present, such that a dimensionally stable framework made of metal is fixed on the base and the manufacturer merely supplies the housing parts, which, comprising split bottom panel, rear wall, front wall, inserted door, a roof and, if appropriate, seals, then complete the outdoor housing by way of on-site assembly.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 3a is a rear view showing a closed housing according to FIG. 1;

FIG. 3b is a side view showing a closed housing according to FIG. 1;

FIG. 3c is a front view showing a closed housing according to FIG. 1;

FIG. 3d is a top view showing a closed housing according to FIG. 1;

FIG. 3e is top, right-front perspective view showing a closed housing according to FIG. 1;

DESCRIPTION OF THE PREFERRED EMBODIMENT

Figure 1:
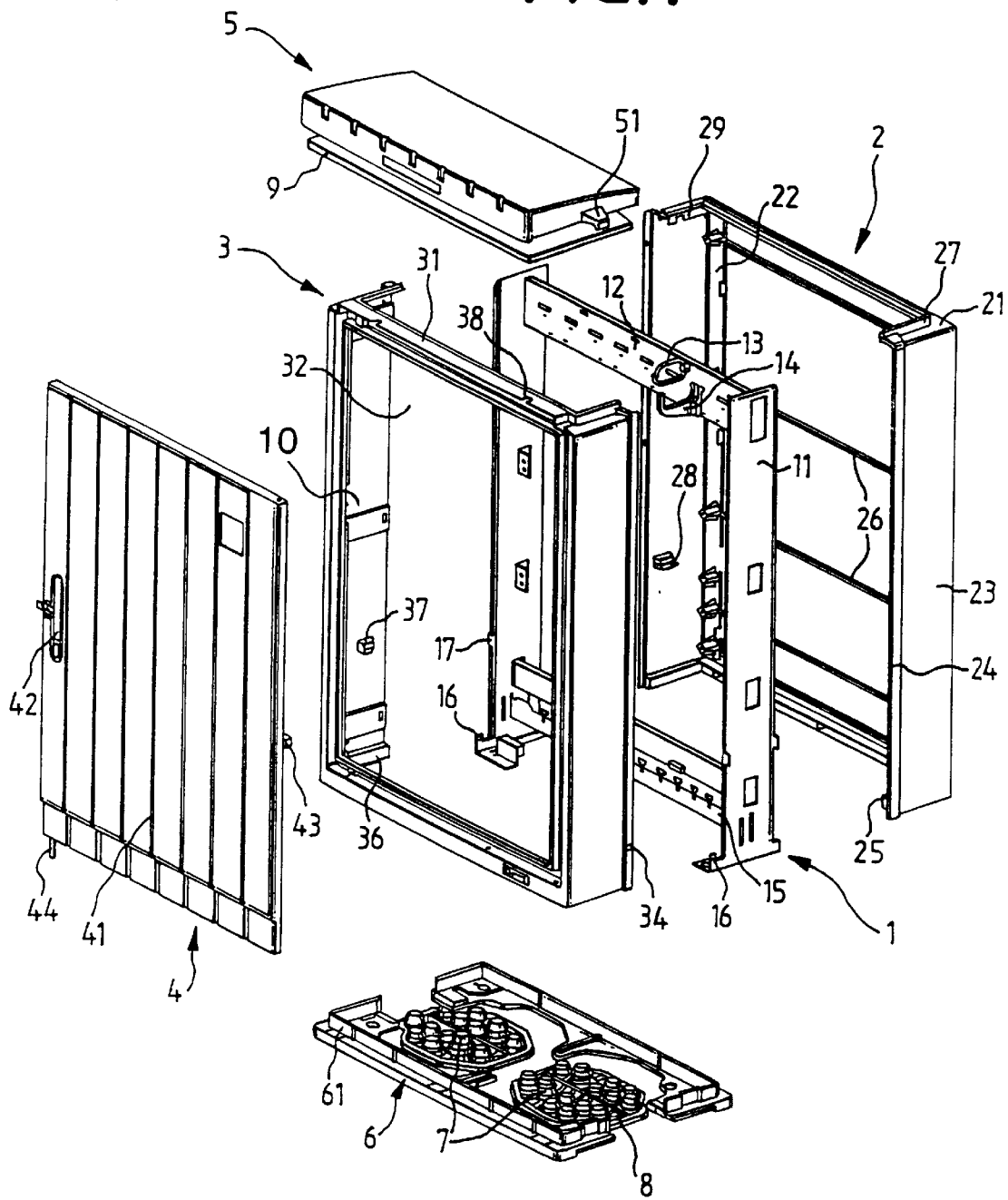
FIG. 1 is an exploded view of a complete housing according to the invention with separate framework.

Referring to the drawings in particular, wherein similar or identical parts are provided with identical designations, FIG. 1 shows a sheet-metal framework 1 with side elements 11 and strain-relief rails 15 and 12. The strain-relief rails 15 and 12 are designed as crossmembers on which cables (not illustrated) can be suspended, with strain relief, by cable rings 13 or retaining means 14. On the sides and in the interior, this framework 1 has retaining noses and guidance devices 17 and 16, respectively, which can latch into complementary guidance devices 37, 36, respectively, of a housing front part 3 and center the housing front part 3. The housing front part 3, which consists of plastic and has an integral side element 33, has an overlapping joint 34 which can be brought into engagement with a complimentary joint, the joining groove 24 on side element 23, in the housing rear part 2, which likewise consists of plastic. The two plastic parts 2, 3, which are shown in the used position in the exploded illustration of FIG. 1, are pushed toward the framework 1 in a mirror-symmetrical manner and are fitted one inside the other until the joints 24 and 34 latch one inside the other. At the same time, the retaining noses and guidance devices 36, 37 and 25 and 28 latch into complimentary parts of the framework 1.

Joints 38 and 27, 29 can be seen on the crossmember 31 of the front part 3 of the housing and the crossmember 21 of the rear part 2 of the housing and serve for the latching of the roof 5, which can be positioned on the two housing parts 2, 3. The crossmembers 21, 31 simultaneously form integral parts of the housing roof, with the result that for the roof 5 too, the joint with the other wall elements 2, 3 is on the top housing surface rather than at the corner regions. Once the roof 5 has been fixed, the protrusion 51 of the roof 5 covers over the coupled lateral joints 24, 34, with the result that it is not possible for any water to penetrate into these joints from above.

A condensed-water-discharge device 9, coupled to the roof 5, completes the housing from above, while, at the front, a closure panel 4 can be inserted into the opening 32 of the front part 3. This closure panel 4 may be retained in the housing part 3 by means of hinges 43, while a handle 42, in combination with a securing device 44, secures said panel in the front part 3. The front wall is heavily profiled by corresponding beads 41, with the result that the closure panel 4 is provided with additional rigidity and, at the same time, the appearance of the large surface of approximately 1 m×1 m is broken up by corresponding shadowing.

Since the framework is usually positioned on a bottom part or base, from which the cables emerge into the housing, the underside of the housing has to be closed from both sides with corresponding bottom parts 6, in which case ribs 61 rest against the housing parts 2, 3 in a sealing manner. In addition, the bottom panels are usually fitted first of all, once the cable leadthrough 7 with corresponding cable-sealing sleeves 8 made of rubber have been positioned around the cables.

The wall elements may also include plastic moldings 10 for fastening insulation to the wall elements. The plastic moldings 10 are preferably in the form of clamping elements.

Figure 2:
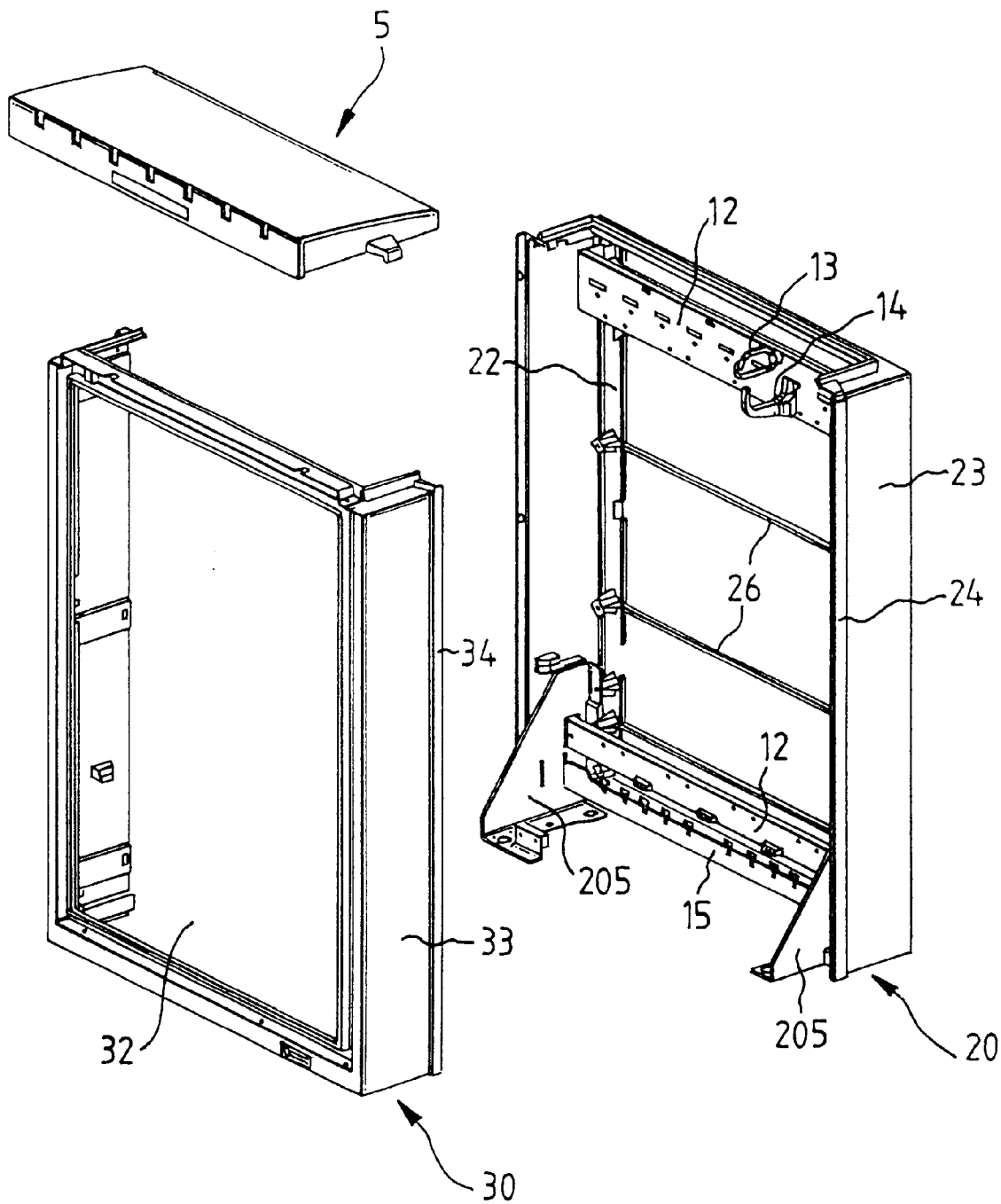
FIG. 2 is an exploded view showing a housing according to the invention with an integrated framework, but without a closure element.

FIG. 2 shows that the housing comprising the same kind of front and rear parts 30 and 20 may additionally or alternatively, be provided with strain-relief rails 12, 15 in one of the two housing parts, in this case the rear housing half 20 with closed rear wall. In this example, the front wall 30 is open in order for assembly work to be carried out in the rear wall from there, but it could, in the same way as the rear wall, be closed. Such a strain-relief rail 15 of the type illustrated in FIGS. 4 and 5 or the like is arranged in the rear wall 20 and is latched in the reinforced corner regions 22. Stiffening means 26 and stable framework parts 205 make this straightforward housing strong and even easier to assemble than that described in relation to FIG. 1.

FIG. 3a shows the completed housing from the rear side with the roof 5 in position, while 3b shows a side view of the housing with the joints 24, 34 located on the side wall of the housing. FIG. 3c is the front view of the closure panel 4 and of the roof 5 of the housing, this roof 5 having being placed in position, while FIG. 3d shows a plan view of the roof 5 with the abovedescribed covering noses 51. FIG. 3e illustrates a perspective view of a closed housing in accordance with the partial views 3a to 3d. The housing has been produced from glass-fiber-reinforced polyester, the individual housing parts having been preformed in a corresponding press by the manufacturer and having been provided with a coloring which can be specified by the customer.

Figure 4:
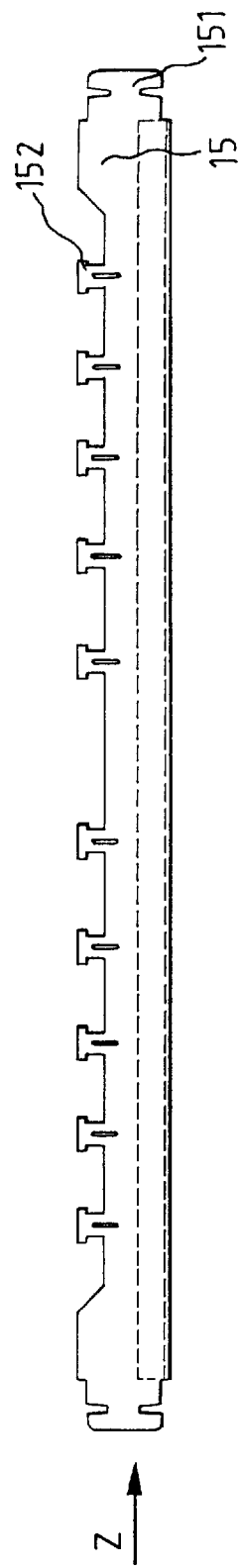
FIG. 4 is a front view of a strain-relief rail for integration in a wall element or a framework.

FIG. 4 shows the front view of a strain-relief rail with corresponding strain-relief hooks 152 for the purpose of suspending cables by means of plastic links. The strain-relief rail 15 can be inserted into the framework by means of latching noses 151 (FIGS. 1, 2). According to the invention, however, it is also possible for these latching noses to be inserted into stiffened corners 22 of a front part, of a rear part 2 or of a housing half 20.

Figure 5:
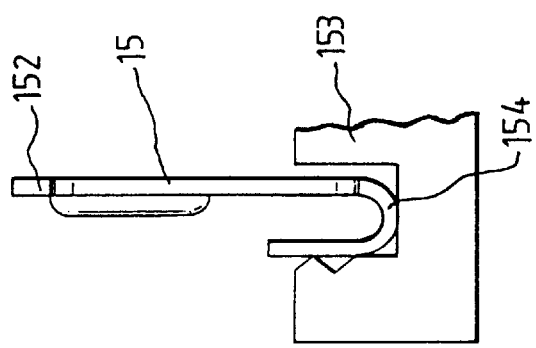
FIG. 5 is a side view of a strain-relief rail.

FIG. 5 shows a side view of FIG. 4. The strain-relief rail 15 with the clamping bracket 154 illustrated at the bottom in this case—it also being possible for this bracket to be used the other way up can also cooperate with corresponding cable clamps 153; the associated clamping screw is not illustrated. The strain-relief hooks 152 may be used in addition.

While specific embodiments of the invention have been shown and described in detail to illustrate the application of the principles of the invention, it will be understood that the invention may be embodied otherwise without departing from such principles.

What is claimed is:

1. A stationary housing for accommodating electrical arrangements, in particular cable-branching arrangements, comprising:

a cable branching arrangement base, said base defines openings for passage of cables:

separately produced wall elements which are made of recyclable, weatherproof plastic, said separately produced wall elements being assembled in a positively locking manner, one of said wall elements forming a front part and one of said wall elements forming a rear part, each of said front part and rear part having integrally formed parts forming side walls of a cuboidal housing;

a dimensionally stable framework fixed on said base, said wall elements enclosing said dimensionally stable framework.

2. The housing as claimed in claim 1, wherein said front part and said rear part include integrally formed parts together forming parts of a housing roof.

3. The housing as claimed in claim 1, wherein said integrally formed parts include borders, the wall elements have joints on said borders for overlapping assembly with each other.

4. The housing as claimed in claim 3, wherein the joints are configured as one of a labyrinth and a grove/tongue.

5. The housing as claimed in claim 1, wherein said front part and said rear part are designed in the same manner;

said wall elements and said framework including retaining noses and guidance devices for sliding said rear part and said front part toward each other from opposite sides of said framework, said retaining noses and guidance devices latching into each other to fasten said front and rear wall to each other and to said framework.

6. The housing as claimed in claim 1, wherein one of said wall elements is provided with a closable opening on its large surface;

said base includes cable sealing sleeves in said openings.

7. The housing as claimed in claim 6, wherein said opening is provided with a closure panel which is made of plastic and is retained internally on a respective one of said wall elements by means of hinges.

8. The housing as claimed in claim 1, further comprising a single-piece housing roof and is fastened on the other wall elements.

9. The housing as claimed in claim 8, wherein:
said front and rear parts are connected by joints and said roof serves for covering said joints.

10. The housing as claimed in claim 8, wherein said roof includes drain means for preventing condensed water from inside the housing from dripping off onto said framework.

11. The housing as claimed in claim 1, wherein at least one wall element is profiled on at least one side.

12. The housing as claimed in claim 1, wherein, the wall elements are connected on inside releasibly to further plastic moldings for fastening sound insulation and heat insulation and for sealing purposes.

13. The housing as claimed in claim 12, further comprising:
clamps connecting said plastic moldings to said wall elements.

14. The housing as claimed in claim 1, wherein said framework is part of one of said wall elements or is fastened on stiffened parts of one of said wall elements.

15. The housing as claimed in claim 1, further comprising a strain-relief means for cables routed into the housing, said strain-relief means being coupled exclusively to said framework.

16. An outdoor housing for accommodating electrical components, comprising:
a cable-branching arrangement base, said base defines openings for passage of cables;
a dimensionally stable framework made of metal fixed on said cable-branching arrangement base;
an enclosure including wall elements comprising a split bottom panel, a rear wall, a front wall with door, and a roof, each element of said enclosure being prefabricated from plastic, and the front wall and the rear wall simultaneously forming side walls by way of integral parts, said front and rear walls being joined together at said integral parts and thus forming said side walls.

17. The housing in accordance with claim 16, wherein:
said wall elements and said framework include retaining noses and guidance devices for sliding said rear wall and said front wall toward each other from opposite sides of said framework, said retaining noses and guidance devices latching into each other to fasten said front and rear wall to each other and to said framework.

18. The housing in accordance with claim 17, wherein:
strain relief means is connected to said framework, said framework transferring strain from said strain relief means to said cable branching arrangement base;
said cable branching arrangement base defines openings for passage of cables, said cable branching arrangement base includes cable sealing sleeves in said openings.

19. The housing in accordance with claim 16, further comprising:
strain relief means connected to said framework and for transferring strain from a cable to said framework, said framework transferring strain from said strain relief means to said cable branching arrangement base.

20. The housing in accordance with claim 16, wherein:
said cable branching arrangement base includes cable sealing sleeves in said openings.

* * * * *